(12) United States Patent
Martinez et al.

(10) Patent No.: US 6,826,484 B2
(45) Date of Patent: Nov. 30, 2004

(54) 3D PRESTACK TIME MIGRATION METHOD

(75) Inventors: Ruben Martinez, Sugarland, TX (US); Chuanwen Sun, Katy, TX (US)

(73) Assignee: PGS Americas, Inc., Houston, TX (US)

( * ) Notice: Subject to any disclaimer, the term of this patent is extended or adjusted under 35 U.S.C. 154(b) by 482 days.

(21) Appl. No.: 09/918,981

(22) Filed: Jul. 31, 2001

(65) Prior Publication Data

US 2003/0208321 A1 Nov. 6, 2003

(51) Int. Cl.$^7$ .............................................. G01V 1/28
(52) U.S. Cl. ......................................... 702/14; 703/5
(58) Field of Search ..................... 702/14, 18; 703/5, 703/10; 324/303; 367/74, 75, 47, 46

(56) References Cited

U.S. PATENT DOCUMENTS

| | | | | | |
|---|---|---|---|---|---|
| 4,677,597 | A | * | 6/1987 | Wright | 367/47 |
| 4,967,401 | A | * | 10/1990 | Barney | 367/46 |
| 6,128,580 | A | * | 10/2000 | Thomsen | 702/18 |
| 6,292,754 | B1 | * | 9/2001 | Thomsen | 702/14 |

FOREIGN PATENT DOCUMENTS

GB  2234771  12/1980

OTHER PUBLICATIONS

Alkhalifah, T., 2000, The offset–midpoint traveltime pyramid in transversely isotropic media: Geophysics, 65, 1316–1325.
Chang, W. F. and McMechan, A. G., 1987, Elastic reverse-time migration: Geophysics, 52, 1365–1375.
Eaton, D.W., Stewart, R. R. and Harrison, M. P., 1991, The Fresnel zone for converted P–SV waves: Geophysics, 56, 360–364.
French, W., 1974, Two dimensional and three dimensional migration of model experiment reflection profiles: Geophysics, 39, 265–277.
French, W., 1975, Computer migration of oblique seismic reflection profiles: Geophysics, 40, 961–980.
Gardner, G. H. F., French, W.S., and Matzo, T., 1974, Elements of migration and velocity analysis: Geophysics, 39, 811–825.
Gray, S. H., 1986, Efficient traveltime calculations for Kirchhoff migration: Geophysics, 51, 1685–1688.
Harrison, M. p., and Stewart R. R., 1993, Poststack migration of P–SV seismic data: Geophysics, 58, 1127–1356.
Schneider, W., 1978, Integral formulation for migration in two and three demensions: Geophysics, 43, 49–76.
Sollid, A., Ekren, B. O. and Arnsten, B., 1996, Prestack time migration applied to marine P–SV seismic waves: 66th Ann. Internat. Mtg., Soc. Expl. Geophys., Expanded Abstracts, 1571–1574.
Wang, S., Bancroft, C. J. and Lawton, D. C., 1996, Converted–wave (P–SV) prestack migration and migration velocity analysis: 66th Ann. Internat. Mtg., Soc. Expl. Geophys., Expanded Abstracts, 1575–1578.
Yilmaz, Ö., 1987, Seismic Data processing: Society of Exploration Geophysicists, Tulsa, pp. 486–490.
Zhe, J., and Stewart R. R., 1997, Prestack multicomponent migration: Geophysics, 62, 598–613.

* cited by examiner

*Primary Examiner*—John Barlow
*Assistant Examiner*—Victor J Taylor
(74) *Attorney, Agent, or Firm*—E. Eugene Thigpen

(57) ABSTRACT

A method is disclosed for migrating seismic data. The method includes selecting an image point and generating an initial model of seismic velocity with respect to time. The initial model includes substantially horizontal layers each having a selected interval velocity and a selected thickness. A travel time of seismic energy is determined from at least one seismic energy source position to at least one seismic receiver position, wherein the seismic energy is reflected from the image point. A ray path is estimated from the at least one seismic source position to the image point and from the image point to the at least one seismic receiver position. The ray path is based on the source position, the receiver position and the velocity model at the image location. A two-way travel time of seismic energy through formations to the image point is then determined.

12 Claims, 11 Drawing Sheets

Fig. 2. A reflector point *R* is specified in the macro-velocity model. The travel-time is computed to *R* from all source points *S* and from all receiver points *G*.

3D PRESTACK TIME MIGRATION METHOD

BACKGROUND OF THE INVENTION

Conventional "true-amplitude migration" is a form of migration of the Kirchhoff type using a weighted diffraction stack. This technique has become increasingly popular as a seismic tool for quantitative discrimination of lithology and fluids in hydrocarbon reservoirs. However, the term "true amplitude migration" is to some extent misdescriptive. From a physical viewpoint, valid amplitude information may only be preserved if the entire processing line is designed for that purpose. In most cases, it is not. Thus, it is virtually impossible to have a "real" true amplitude migration in practice, because many processing procedures affect the amplitude preservation.

Furthermore, conventional true amplitude weight terms are complicated and do not consider many necessary factors. In a smoothly varying velocity field, for example, the amplitude weight depends on the travel-time, amplitude, ray-tube spreading factor, and takeoff angles in the shot and receiver points.

Even further, conventional approximations of the reflection travel-times often assume a small offset-to-depth ratio, and their accuracy decreases with increasing offset-to-depth ratio. Hence, they are not suitable for migration of long-offset reflection seismic data.

Finally, conventional Kirchhoff time migration for transversely isotropic media with a vertical symmetry axis (VTI media) is implemented using an offset-midpoint travel-time equation. However, travel-times as functions of offset and common midpoint (CMP) are given by the simple analytical double-square-root equation (DSR) designed for homogeneous media. This travel time is not well suited for inhomogeneous media.

Thus, there is a long felt need for a relative true amplitude migration process which preserves relative amplitude, considers the appropriate factors, is accurate for long-offset data, and is suitable for vertically transversely isoropic (VTI) media, also called transverse isotropy with a vertical symmetry axis. The present invention addresses the above mentioned concerns.

SUMMARY OF THE INVENTION

One aspect of the invention is a method for migrating seismic data. A method according to this aspect of the invention includes selecting an image point, and generating a model of seismic velocity with respect to time. The model includes substantially horizontal layers each having a selected velocity and a selected thickness. A two-way travel time of seismic energy is determined from at least one seismic energy source position to at least one seismic receiver position wherein the seismic energy is reflected from the image point. A ray path is estimated from the at least one seismic source position to the image point and from the image point to the at least one seismic receiver position. The ray path is based on the source position, the receiver position and the velocity model. The two-way travel time of seismic energy through formations to the image point is then determined.

DETAILED DESCRIPTION OF EXAMPLE EMBODIMENTS OF THE PRESENT INVENTION

Figure 1:
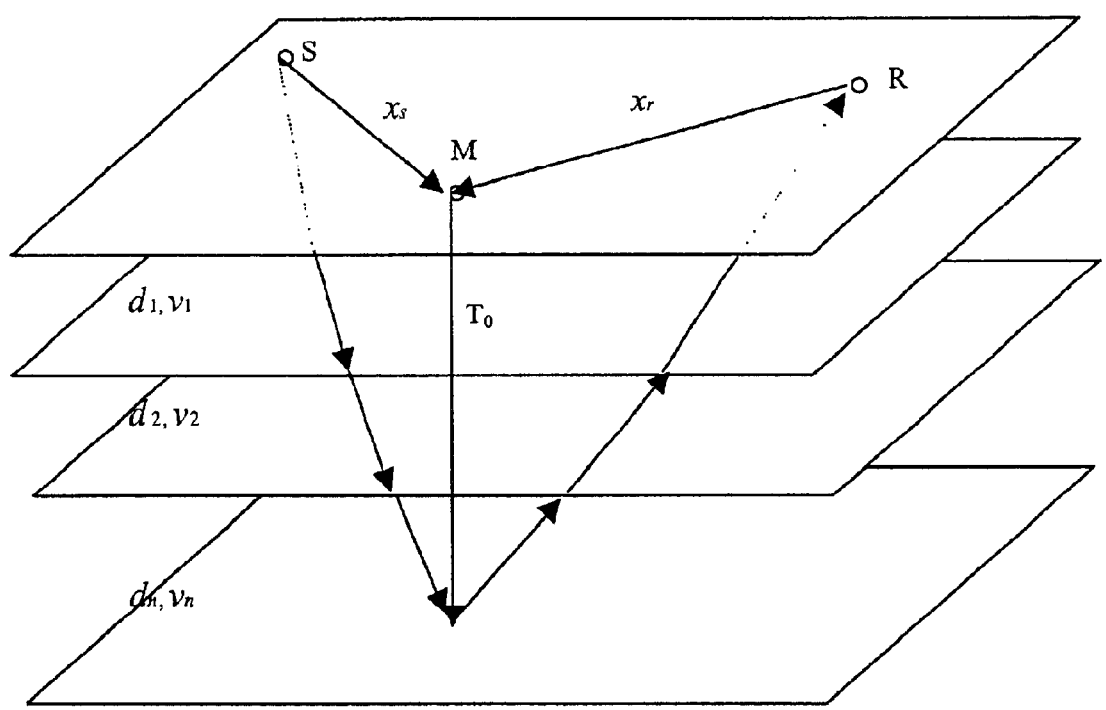
FIG. 1 is a diagram of a horizontally layered medium of an example embodiment of the present invention.

In one example embodiment of the present invention, a method of Kirchhoff migration is presented that includes ray-bending and amplitude preservation in transversely isotropic media with a vertical symmetry axis (VTI media). The new method is called 3D prestack time migration. In one embodiment, the method uses a Kirchhoff operator and determines the kinematics or the shape of the operator from travel-times computed assuming V(z) and VTI media. In a further embodiment, to include ray bending, the earth is assumed to consist of horizontal layers so that the velocity profile used to calculate the travel times is simply a function of depth or time. Because ray-bending and VTI are considered, the takeoff angles for shots and receivers are calculated accurately compared to those obtained assuming straight rays. Thus, in further embodiments, the amplitude correction terms of the operator are determined using the takeoff angles for preserving the amplitude. The method is robust in the presence of an irregular geometry and therefore lends itself well to application on most modern seismic marine, OBS, and land geometries.

In a further embodiment, the method has the following main steps: 1. A time table is constructed to calculate the output imaging time. 2. The input is duplicated in the time domain for anti-alias filtering and resample. 3. The velocity, VTI parameter and mute tables are set up for each CDP and distributed uniformly among the processors. 4. The migration starts. The first processor reads a trace (record) and broadcasts the trace (record) to all processors. Then, all processors begin imaging the data. 5. The migration operators are built by calculating the high order (ray-bending effect) and VTI travel-times and amplitude correction terms. 6. The 3D prestack time migration completes the migration and outputs data in gather or non-gather modes.

In a further embodiment, the method further comprises determining a ray bending effect for large offset to depth rations. Those of ordinary skill will recognize that dense three-dimensional seismic reflection data is acquired on an increasingly routine basis. These large volumes of data offer the potential for very high-resolution 3D images of subsurface geology and subsequent estimation of the earth's physical properties (Lumley and Beydoun, 1992). In seismic acquisition, energy from all sources is spread from one scatter-point to all receivers. Consequently, all input traces can contain energy from the scattering point. When the input traces have a finite recording time, the scattered energy is restricted to traces within the prestack migration aperture of the scattering point. The objective of prestack migration is to gather this energy and sum it back to the scatter-point location. The key points are how to obtain an accurate travel-time for having better imaging and preserving the amplitudes.

Ray-Bending for a Large Offset-to-Depth Ratio

The double square root equation to compute the travel-times is fundamental in conventional Kirchhoff migration. In these conventional migrations the velocity is assumed to be constant, then straight ray is used for travel-time computations at an imaging point. Thus, the velocity change in vertical and lateral directions should not be too large. The conventional double square root equation is exact in the sense that there are no error terms dependent on dip angle and offset. However, this conventional double square root equation assumes straight ray paths through the earth and does not faithfully correct for ray path bending associated with vertical changes in velocity. This is particularly erroneous for wide-angle ray paths such as those at steep dips or long offsets. Ray tracing travel-times include these effects and are more accurate. In a further embodiment of the present invention, the double square root formulation is improved by including higher order move-out terms. In principle, the move-out equation for V(z) consists of an infinite series of higher order terms. The number of terms needed in order to be accurate depends upon the vertical velocity profile and the propagation angle. The ray tracing approach removes these issues by accounting for the bending accurately.

FIG. 1 illustrates a layered media. $d_k$, $V_k$ is the thickness and velocity at kth layer respectively. Thus, the down or up travel-time is expressed by:

$$T_x = \sum_{k=1}^{n} \frac{p_k}{v_k} = \text{minimum} \tag{1}$$

-continued $$p_k^2 = d_k^2 + x_k^2 \tag{2}$$

$$x = \sum_{k=1}^{n} x_k \tag{3}$$

Where $x=x_r$ or $x=x_s$, which is the distance between the receiver and imaging point, and the shot and imaging point, respectively. The minimum requirement in equation (1) under the constraint of equation (3) leads to:

$$\frac{\partial T_x}{\partial x_k} = \frac{x_k}{p_k v_k} = \lambda \tag{4}$$

where lamda is a Lagrange multipler. From equation (2) and equation (4) we get $$x_k^2 = \frac{\lambda^2 v_k^2 d_k^2}{1 - \lambda^2 v_k^2} \tag{5}$$

where $$\frac{x_k^2}{p_k^2 v_k^2} = \frac{x_k^2}{(d_k^2 + x_k^2)v_k^2} = \lambda^2$$

Thus, we have $$x = \lambda \sum_{k=1}^{n} \frac{v_k d_k}{\sqrt{1 - \lambda^2 v_k^2}} \tag{6}$$

$$T_x = \sum_{k=1}^{n} \frac{d_k / v_k}{\sqrt{1 - \lambda^2 v_k^2}} \tag{7}$$

Equations (6) and (7) are the parametric forms of the time-distance relationship with Lamda as parameter as given in Slotnick.[1] As Lamda varies from 0 to 1/v, where v=max (v1, v2, ..., vn), x will vary from 0 to infinite. We have $$\lambda = \frac{\sin\theta_k}{v_k} \tag{8}$$

Let $$T_x^2 = c_1 + c_2 x^2 + c_3 x^4 + c_4 x^6 + c_5 x^8 + c_6 x^{10} + \cdots \tag{10}$$

Where we have $$c_1 = a_1^2 \qquad c_2 = \frac{a_1}{a_1} \qquad c_3 = \frac{a_2^2 - a_1 a_3}{4a_2^4} \qquad c_4 = \frac{2a_1 a_3^2 - a_1 a_2 a_4 - a_2^2 a_3}{8a_2^7}$$

$$a_1 = 2\sum_{k=1}^{n} \frac{d_k}{v_k} \quad a_2 = 2\sum_{k=1}^{n} v_k d_k \quad a_3 = 2\sum_{k=1}^{n} v_k^3 d_k \qquad a_4 = 2\sum_{k=1}^{n} v_k^5 d_k$$

[1]Incorporated herein by reference.

In still a further embodiment, to obtain a travel-time approximation with good accuracy at large offsets, a new series which is based on a large offset-to-depth ratio rather than a small one is derived:

$$T_x = \sqrt{c_1 + c_2 x^2 + c_3 x^4 + c_4 x^6 + c_5 x^8 + c_6 x^{10} + \cdots} \tag{11}$$

$$= \sqrt{(c_1 + c_2 x^2 + c_3 x^4)\left(1 + \frac{c_4 x^6 + c_5 x^8 + c_6 x^{10} + \cdots}{c_1 + c_2 x^2 + c_3 x^4}\right)}$$

$$= \sqrt{(c_1 + c_2 x^2 + c_3 x^4)}\left(1 + \frac{1}{2}\frac{c_4 x^6 + c_5 x^8 + c_6 x^{10} + \cdots}{c_1 + c_2 x^2 + c_3 x^4} + \cdots\right)$$

$$= \sqrt{(c_1 + c_2 x^2 + c_3 x^4)} \left(1 + \frac{1}{2} CC \frac{c_4 x^6}{c_1 + c_2 x^2 + c_3 x^4}\right)$$

CC is a constant which depends on the new series. Thus, the total down-up travel time is determined;

$$T = T_g + T_s \quad (12)$$

$$= \left(1 + \frac{1}{2} CC \frac{c_4 x_6^r}{T_{g0}}\right) + T_{s0}\left(1 + \frac{1}{2} CC \frac{c_4 x_s^6}{T_{s0}}\right)$$

In equation (12), the fourth and sixth order series correspond to the large offset asymptotic travel-time. This travel-time has a higher accuracy than conventional travel times using the double-square-root equation. In addition, equation (12) is derived from the general sixth order series and it should be more accurate. Thus, in a further embodiment, equation (12) is used to calculate the travel-time for the large offset-to-depth ratio. Later, we will demonstrate how the travel-time calculated with equation (12) is close to the true travel-time.

Travel-Time in Transversely Isotropic Media

In still a further embodiment of the present invention, a Kirchhoff time migration for transversely isotropic media with a vertical symmetry axis (VTI media) is provided using an offset-midpoint travel-time equation. The derivation of such an equation for VTI media requires approximations that pertain to high frequency and weak anisotropy. However, the resultant offset-midpoint travel-time equation for VTI media is highly accurate for even strong anisotropy. In one embodiment, the travel-time equation is dependent on two parameters: migration velocity and the anisotropy parameter η.

In homogeneous VTI media, it has been demonstrated that P-wave velocity $V_{p0}$ and travel-time are practically independent of S-wave velocity, even for strong anisotropy. This implies that, in a further embodiment, for the migration purposes, the travel-time is expressed, $$T_x = \sqrt{T_0^2 + \frac{x^2}{V_{rms}^2} - \frac{2\eta x^4}{V_{rms}^2 [T_0^2 V_{rms}^2 + (1 + 2\eta)x^2]}} \quad (13)$$

where, $$\eta = \frac{\varepsilon - \delta}{1 + 2\delta},$$

where ε and δ are anisotropic parameters.

The travel-time calculated with equation (13) is accurate. It is also stable for a large offset-to-depth ratio.

Thus, in a further embodiment, the total down-up travel-time for a VTI media is, $$T = \sqrt{T_0^2 + \frac{x_s^2}{V_{rms}^2} - C(VTI)x_s^4} + \sqrt{T_0^2 + \frac{x_s^2}{V_{rms}^2} - C(VTI)x_s^4} \quad (14)$$

where $$C(VTI) = \frac{2\eta}{V_{rms}^2 [T_0^2 V_{rms}^2 + (1 + 2\eta)x^2]}$$

The offset-midpoint travel-time formula, equation (14), for VTI media is similar to the double square root equation for isotropic media but as a function of the source and receiver ray parameters. In addition, the efficiency in travel-time calculation using equation (14) allows its practical use in parameter estimation.

Travel-Time With Ray-Bending and VTI Media for a Large Offset-to-Depth Ratio

Equation (14) is a formula to calculate the travel-time for a VTI media at small offset-to-depth ratio. In conventional methods, we use ray-tracing to calculate the travel time for a large offset-to-depth ratio for VTI media. This is a depth migration procedure and it is very time consuming. Here, in a further embodiment, we develop a new method to take VTI into account for time migration without ray-tracing. The travel-time difference between straight ray (with the double square root) and VTI is calculated, $$\Delta T = \sqrt{T_0^2 + \frac{x_s^2}{V_{rms}^2}} - \sqrt{T_0^2 + \frac{x_s^2}{V_{rms}^2} - C(VTI)x_s^4} + \sqrt{T_0^2 + \frac{x_r^2}{V_{rms}^2}} - \sqrt{T_0^2 + \frac{x_r^2}{V_{rms}^2} - C(VTI)x_r^4}.$$

Because the traveltime caused by VTI media is much shorter than that of the straight ray general case, in still a further embodiment, we make an approximation for simplifying code implementations, $$\Delta T = \frac{C(VTI)x_s^4}{2\sqrt{T_0^2 + \frac{x_s^2}{V_{rms}^2}}} + \frac{C(VTI)x_r^4}{2\sqrt{T_0^2 + \frac{x_r^2}{V_{rms}^2}}}. \quad (15)$$

Equation (15) is the travel-time difference between the straight ray assumption without VTI and with VTI. In a further embodiment, combining equations (15) and (12), we calculate the travel-time to include both ray-bending and VTI.

$$T = T_g + T_s + \Delta T \quad (16)$$

$$= T_{g0}\left(1 + \frac{1}{2} CC \frac{c_4 x_6^r}{T_{g0}^2}\right) + T_{s0}\left(1 + \frac{1}{2} CC \frac{c_4 x_s^6}{T_{s0}^2}\right) + \Delta T(VTI)$$

The difference ΔT is due to VTI, therefore, we combine equations (12) and (15) for VTI and large offset-to-depth ratio (equation 16). Equation (16) takes both ray-bending and VTI effects into account for large offset-to-depth ratios.

Weighting Function for the Relative True Amplitude Migration

Knowledge of elastic parameters (compressional and shear velocities and density) contrasts within the earth can be correlated to lithology and fluid changes. Elastic parameter contrasts manifest themselves on seismic records as a function of angle-dependent reflectivity. Interpretation of angle-dependent reflectivity, or amplitude variation with offset (AVO), on unmigrated records is often hindered by the geometrical spreading loss, as well as other factors. Various conventional migration algorithms involving weighted diffraction stacks proposed by geophysicists are based on Born[2] or Kirchhoff[3] approximations. In a further embodiment of the present invention, the principal issue in the attempt to recover angle-dependent reflection coefficients becomes the removal of the geometrical spreading factor of the primary reflections. In one embodiment, the weight function that achieves this aim is independent of the unknown reflector and correctly accounts for the recovery of the source pulse in the migrated image irrespective of the source-receiver configurations employed and the caustics occurring in the wave-field. Thus, one principal aim of the amplitude-preserving migration consists of removal of the geometrical spreading factor from seismic primary reflections without any knowledge of the search for subsurface reflector. In a further embodiment, the weight formula derived by Schlejeher et al.[4] is expressed as, $$w(\xi, R) = \frac{\sqrt{\cos\alpha_s \cos\alpha_g}}{v_s} \frac{|\det(\Gamma_S^T N_{SR} + \Gamma_S^T N_{SR})|}{\sqrt{|\det(N_{SR})|} \sqrt{|\det(N_{GR})|}} \quad (17)$$

[2]Incorporated herein by reference.
[3]Incorporated herein by reference.
[4]Incorporated herein by reference.

Now let us discuss the assumptions in equation (17).
1. The source pulse is reproducible.
2. The source and receivers fall on a planar surface, and reflection points lie on smoothly curved interfaces.
3. The wave propagation is described by zero-order ray theory.
4. The ray amplitude varies slowly with offset.
5. The weight function does not vanish at the stationary point.

Now let us explain all quantities that appear in equation (17),
1. Angles $\alpha_s$ and $\alpha_g$ are the takeoff and emergence angles of the central ray.
2. Parameter $v_s$ is the P-wave velocity at source point.
3. $\Gamma_s$ and $\Gamma_G$ denote certain constant 2×2 matrices describing the source and geophone locations with respect to the position vector $\xi$. They depend on the measurement configuration.
4. $N_{SR}$ and $N_{GR}$ are second-order mixed-derivative Hessian matrices of travel-times.

It is important to note that the quantities appearing in equation (17) only depend on the two individual ray branches SR and RG and not on any reflector properties. In other words, they are computed for a complete ray SRG irrespective of whether or not there is a reflector at R. This has an important consequence. It means that equation (17) allows for a generalization to all points S and G specified by any coordinate pair ($\xi_1$, $\xi_2$) and any point M in the macro-velocity model.

In a further embodiment, equation (17) is modified for coding. First let us suppose that the ray branches SR and RG are straight, thus, $$w(\xi, R) = \frac{\sqrt{\cos\alpha_s \cos\alpha_g}}{v_s} \left\{ T_r \left[ \frac{T_g}{T_s^2} + \frac{T_s}{T_g^2} \right] + \frac{4L^2 H^2 \sin^2(\alpha)}{T_s T_g T_r^2 V_r^4} \right\} \quad (18)$$

Figure 2:
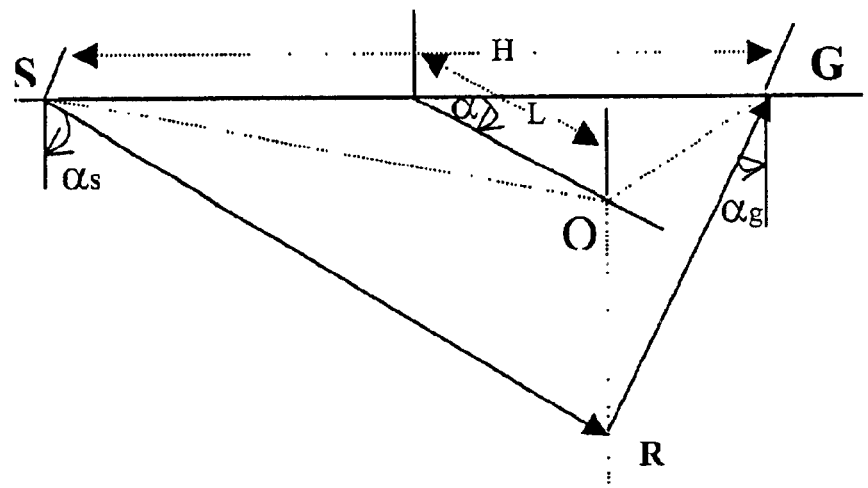
FIG. 2 is a diagram of the geometry of an example embodiment of the present invention.

FIG. 2 illustrates the parameters that appear in equation (18). T is equal to $T_s + T_g$, $T_s$ is the travel-time from source point S to the reflector R, and $T_g$ is the travel-time from R to the receiver point G. $V_r$ is the RMS velocity at the R location. $\alpha$ is an azimuthal angle. The second term in equation (18) will have a contribution only if geologic dips are non-zero. Equation (18) is only valid for zero-dip conditions. In still a further embodiment, equation (18) is derived based on the straight ray assumption. It might generate a large error in the weighting function calculation from a large offset H. As we know, the takeoff and emergence angles, $\alpha_s$ and $\alpha_g$, depend not only on the geometry, but also on the velocity model. Thus, in one embodiment, angles $\alpha$ and $\alpha_g$ should not be computed with the straight ray assumption as following, $$\cos(\alpha_s) = \frac{T_0}{T_s} \text{ and } \cos(\alpha_g) = \frac{T_0}{T_g}$$

Instead, using an alternate embodiment, we calculate the angles $\alpha_s$ and $\alpha_g$ differently. We have shown that equation (16) gives an accurate travel-time, therefore, all quantities that appear in equation (18) are calculated using equation (16). Hence, we have $$\cos(\alpha_s) = \sqrt{1 - \left(\frac{\partial T_s}{\partial x_s}\right)^2 V_s^2}, \text{ and } \cos(\alpha_g) = \sqrt{1 - \left(\frac{\partial T_g}{\partial x_g}\right)^2 V_g^2} \quad (19)$$

Equation (18) is derived using the straight ray assumption, hence in some embodiments, the weighting function is in error. However, in alternate embodiments, if we compute the travel-times using equation (16) which accounts for ray-bending and optionally VTI, the calculation of the takeoff and emergency angles, $\alpha_s$ and $\alpha_g$ using equation (19) and the weights calculated with equation (18) should yield a small error compared to the error obtained using equation (18) and the straight ray assumption for takeoff and emergence angles, $\alpha_s$ and $\alpha_g$.

Pre-stack Kirchhoff Time Migration with Amplitude Preservation and Weak VTI Media Kirchhoff prestack migration is based on the Kirchhoff boundary integral solution to the scalar wave equation. It is a mathematical statement of Huygens' principle in that the wavefield at any interior point in a volume can be reconstructed by a surface integration of the boundary values of the wavefield, weighted by the Green's function impulse response to the wave operator. In some embodiments, Kirchhoff time migration is expressed by using shot ($x_s$, $y_s$), receiver ($x_g$, $y_g$), and imaging point ($x_i$, $y_i$) coordinates as $$I(T, x_i, y_i) = \int W(\xi, R) \, D(T = T_s + T_g) dx dy \quad (20)$$

Where I(T, $x_i$, $y_i$) is the image. T is the travel time from shot point S to the receiver G going through the image point R or "imaging time." W($\xi$, R) is a weighting function, D(T=$T_s T_g$) is the time derivative of the input data. In a further embodiment, by substituting equations (16), (17) and (19) into (20), we have a formula for the Kirchhoff time migration with preserved amplitude and weak VTI media.

Implementation

Substituting OS and OR into equation (15), we have, $$T = T_s + T_g = \sqrt{T_o^2 + \frac{OS^2}{V_{rms}^2} + c_3 OS^4 \left(1 + \frac{1}{2} CC \frac{c_4 OS^6}{T_{s0}^2}\right)} + \sqrt{T_o^2 + \frac{OG^2}{V_{rms}^2} + c_3 OG^4 \left(1 + \frac{1}{2} CC \frac{c_4 OG^4}{T_{g0}^2}\right)} + \Delta T(VTI) \quad (21)$$

Equation (20) is the kernel part of some embodiments of the time migration for VTI media with, amplitude preservation including the ray-bending effect due to V(Z). In one example embodiment, FORTRAN is used to do the intensive computation, sample mapping from input to all of output targets, because FORTRAN is more efficient than C. The kernel part, FORTRAN codes, takes over 85% of the total time consuming. C codes handle the I/O, parameter controls.

In some embodiments, FORTRAN is used to do the intensive computation, sample mapping from input to all of output targets. In some embodiments, the kernel part, FORTRAN codes, takes over 85% of the total time consuming. C codes handle the I/O, parameter controls.

Data Flow

Figure 11:
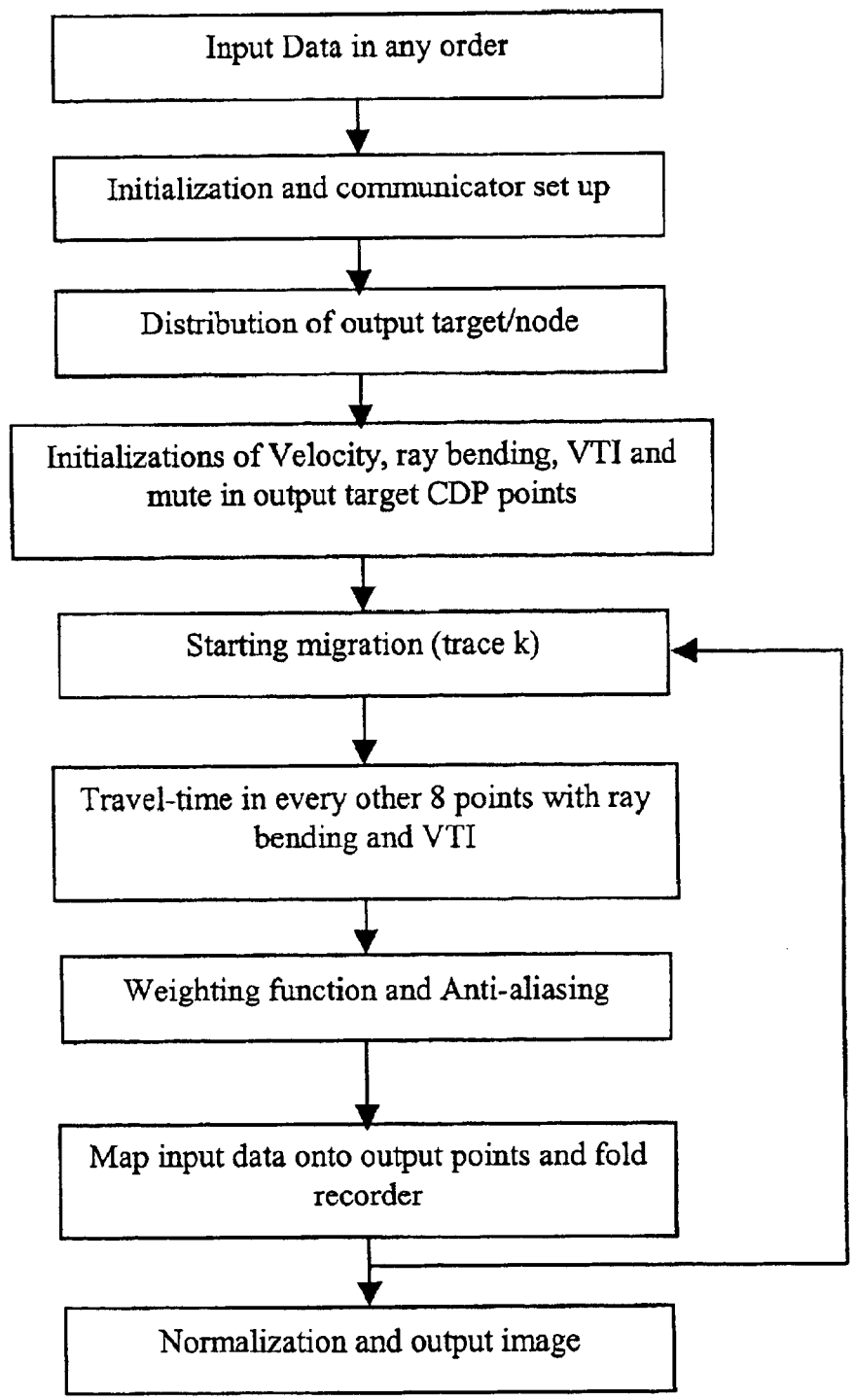
FIG. 11 is a flow chart illustrating a job flow of one example embodiment of the present invention.

In most embodiments of the present invention, the migration must be the last procedure in a job flow. It outputs stack or gather volume. FIG. 11 illustrates a job flow of one example embodiment of the present invention. Unlike conventional techniques, example embodiments of the present invention have a logic to compensate for fold variations, the method has the capability of using multiple nodes, and will divide equally the user specified output target bins among the nodes so that each node will have every nth CDP as a target; where n is the node number. In most embodiments, the nodes must have sufficient memory to hold all of the target bins (including offsets when doing gathers). Insufficient memory will result in the job aborting immediately. The job will let the user know about how many processors would be required to have enough memory available. The compute time of the nodes does not scale linearly with the number of nodes. This means that increasing the number of nodes will decrease the elapsed time of the job, but the number of input traces processed per node hour will also decrease.

Figure 3:
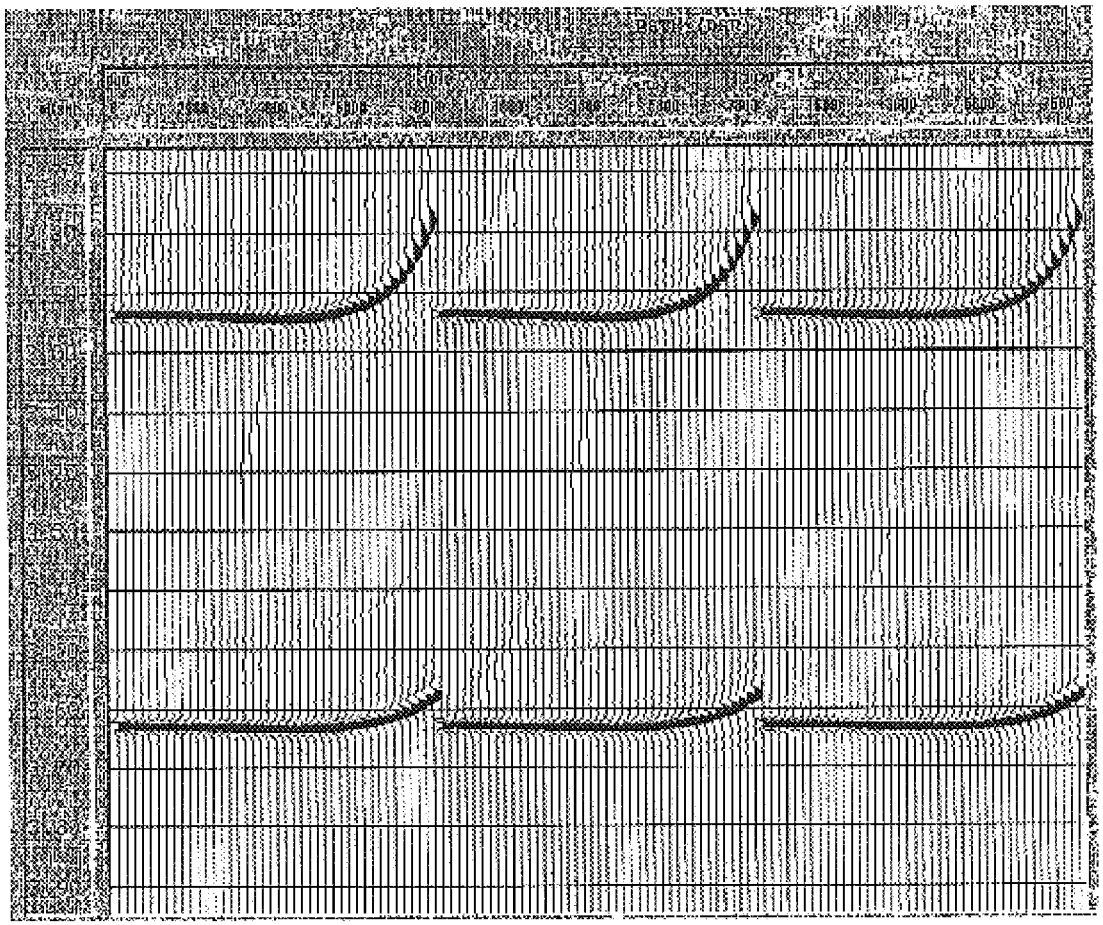
FIG. 3 is a diagram of a seismic gather using a conventional migration (straight ray) method.
Figure 4:
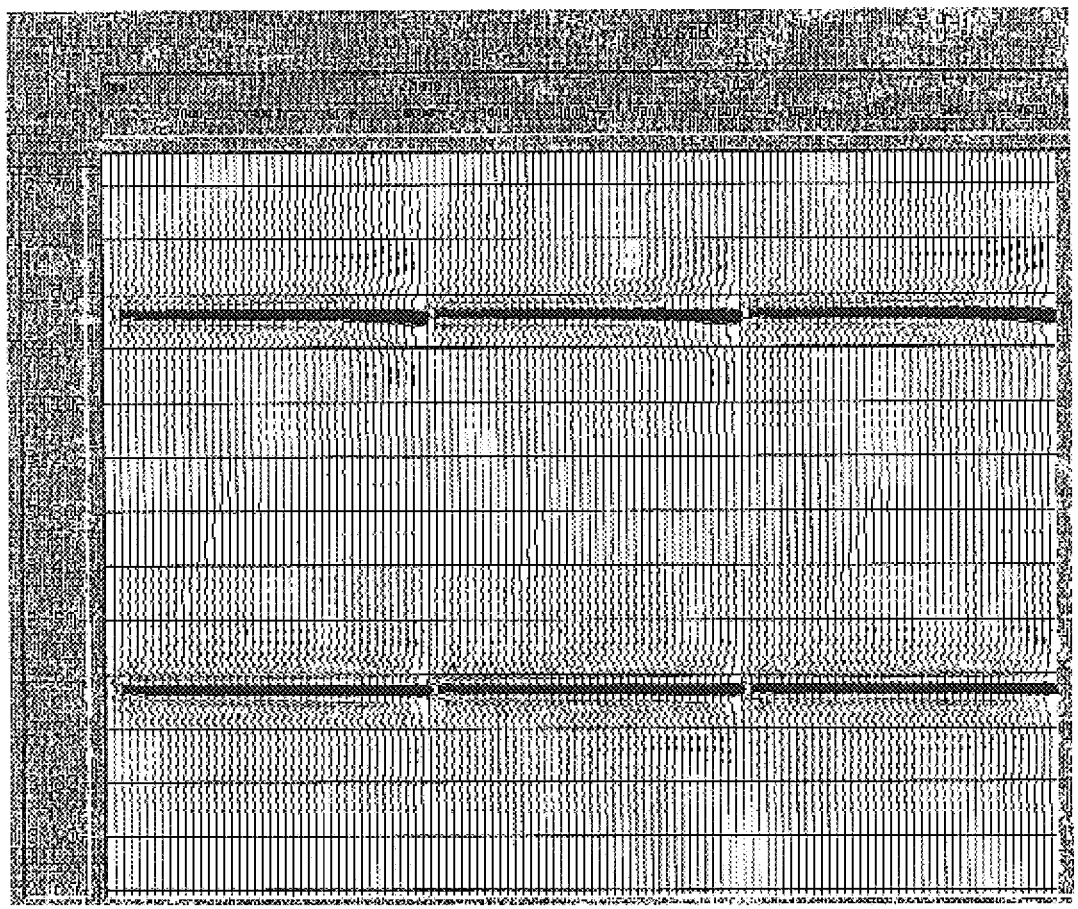
FIG. 4 is a diagram of a seismic gather using an example embodiment of the present invention.

A one dimensional model was used for testing and comparisons between the conventional straight ray PSTM and this ray bending PSTM. FIG. 3 shows the migration result by using conventional straight ray migration techniques. The gather output at the same CDP location is not flat. FIG. 4 is the result of one example embodiment of the present invention. We see that the event at a CDP location is flat, which is what we expect.

Figure 5:
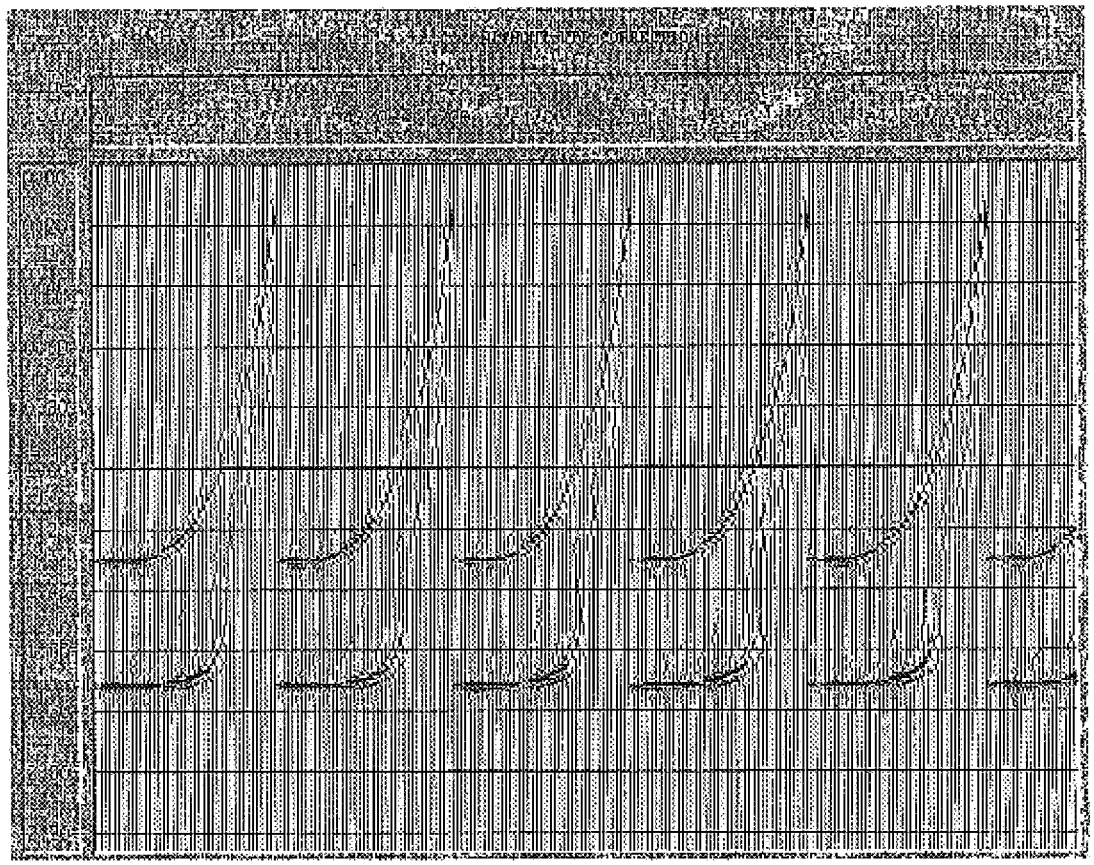
FIG. 5 is a diagram of a seismic gather using a conventional migration (straight ray) method.
Figure 6:
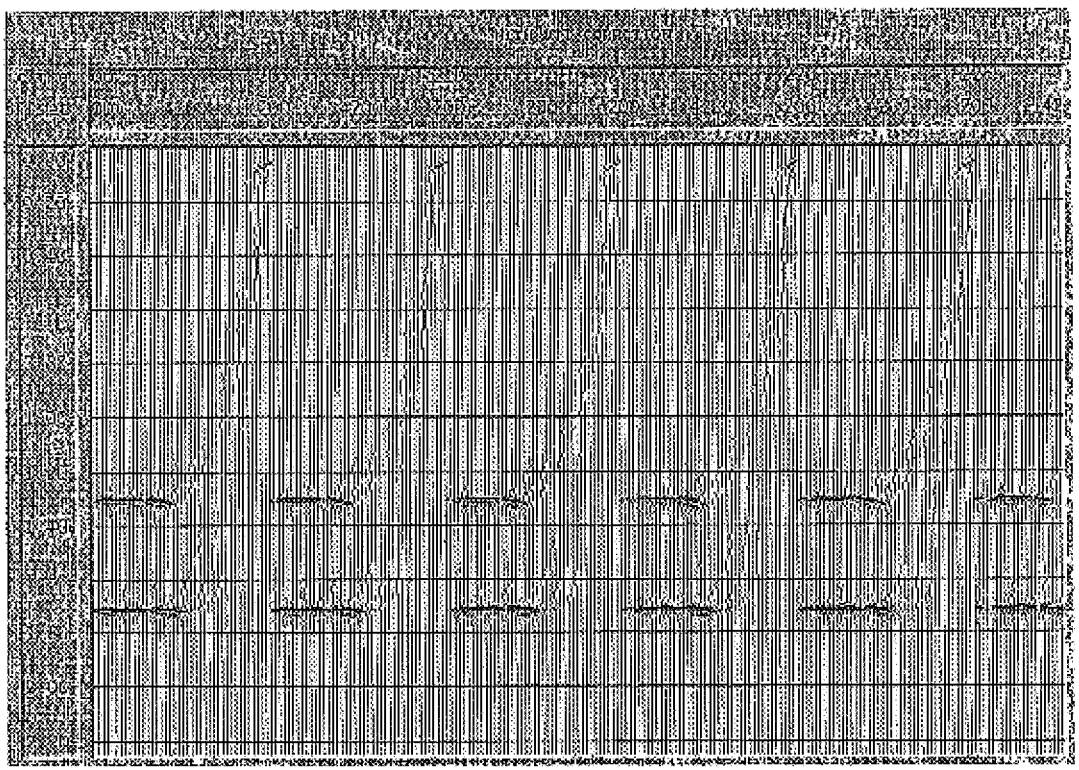
FIG. 6 is a diagram of the outputs of an example embodiment of the present invention which accounts for transversely isotropic media (VTI).

Meanwhile, we have tested a simple 1D VTI model. FIGS. 5 and 6, respectively, shows the resultsof example embodiments produced without and with VTI correction. The travel-times are greatly effected by VTI.

Figure 7:
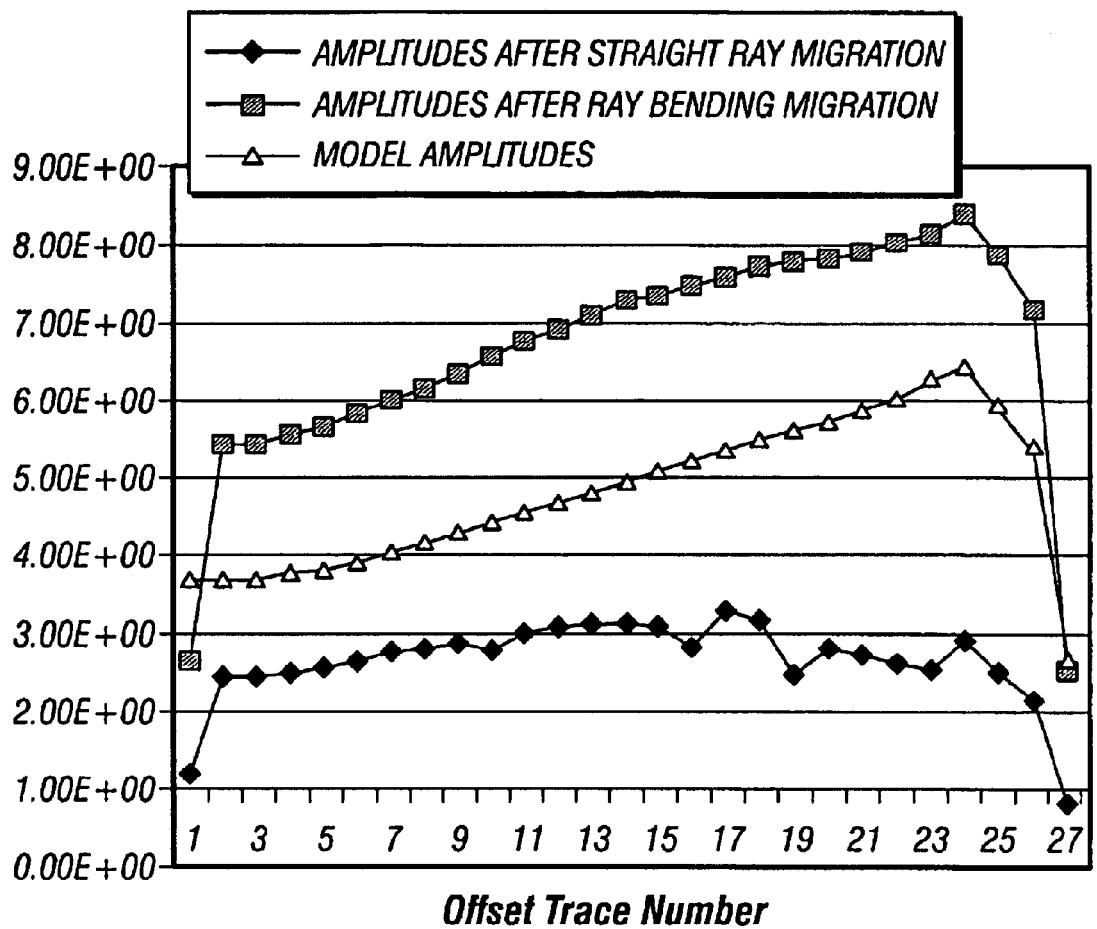
FIG. 7 is a diagram comparing amplitudes of an example embodiment of the present invention and a conventional migration technique.

In order to test the amplitude preserving, we have generated two datasets by using the same model, the first one is without the spreading factor, the second one is with the spreading factor. We use an example embodiment, to migrate the second model data and output its imaging gather at the different CDP locations. The amplitudes of the example embodiment of the method for different offsets should be equivalent to that of the CDP gather after NMO to the first dataset. FIG. 7 shows the amplitudes at the different offsets. In FIG. 7 the top is the example embodiment, the middle is the NMO gather, and the bottom is a conventional straight ray migration technique.

Figure 8:
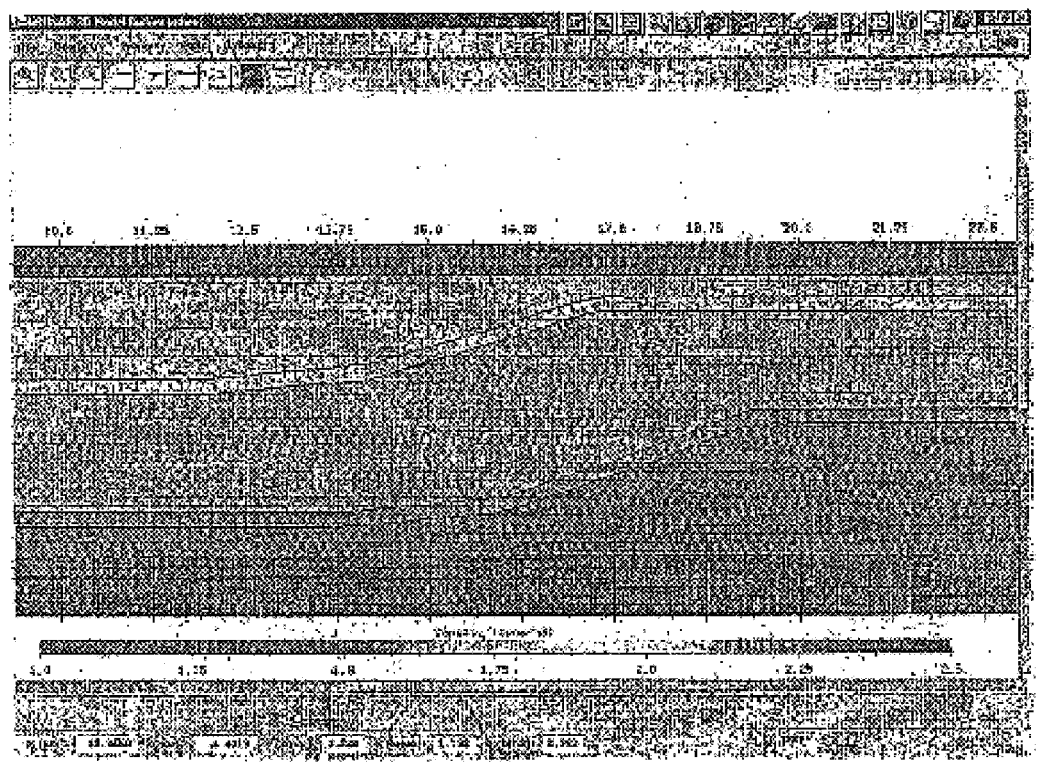
FIG. 8 is a diagram of a model. Densities are displayed although velocities and densities were used for the seismic modeling.
Figure 9:
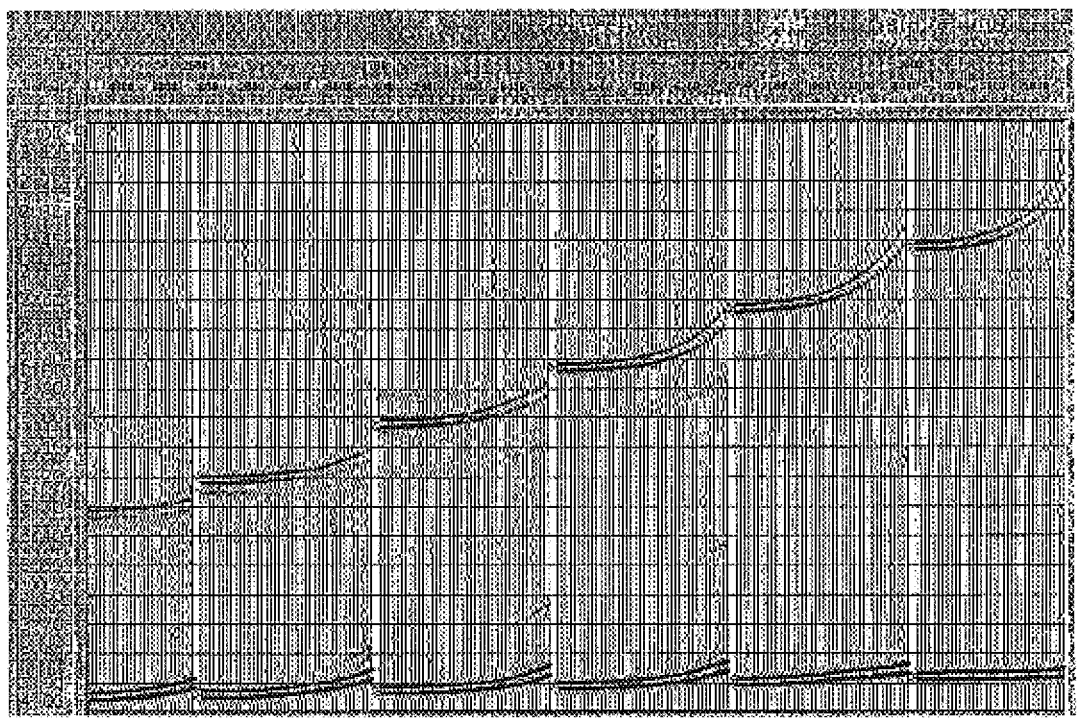
FIG. 9 is a diagram of the outputs of a conventional migration technique using the straight ray approximation of model data corresponding to the model from FIG. 8.
Figure 10:
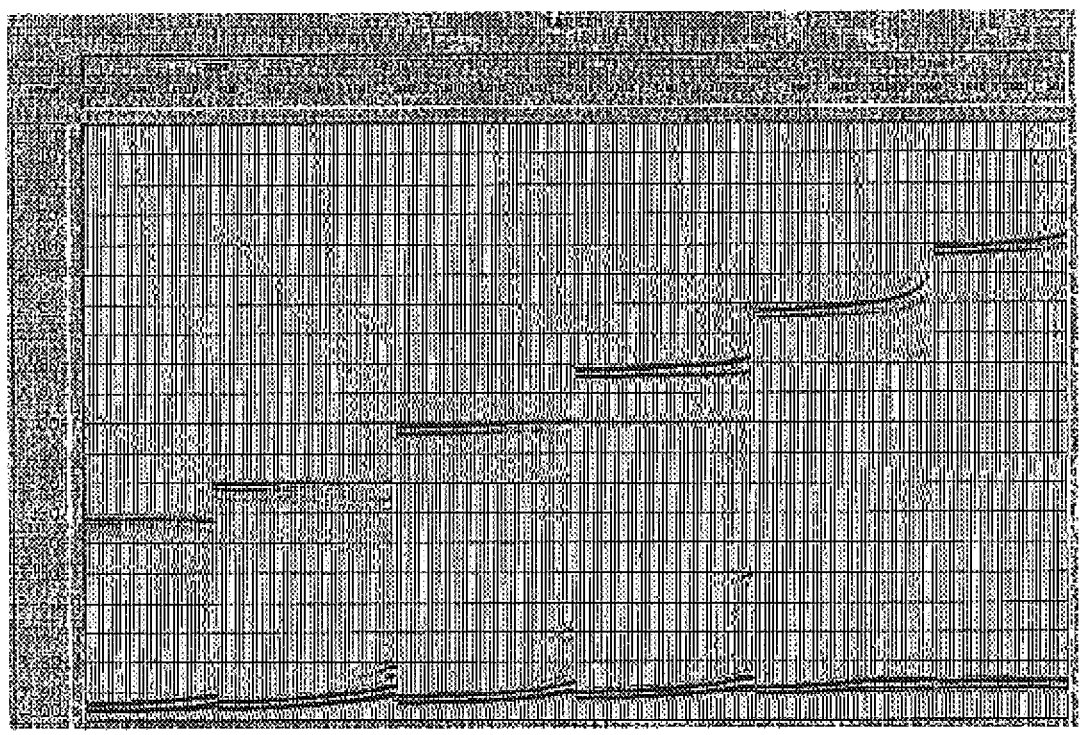
FIG. 10 is a diagram of the outputs of an example embodiment of the present invention.

FIG. 8 is a 2D model displaying the density. In this example embodiment, ray-tracing has been used to generate the synthetic data using compressional and shear velocities and densities. FIGS. 9 and 10 are the gather outputs of a conventional migration technique and an example embodiment of the present invention. The example embodiment of the present invention does a better job than the conventional straight ray technique in dip structure.

In a further embodiment of the present invention, a method is provided for migrating seismic data. The method comprises determining a travel time; determining a ray-bending correction; determining an amplitude correction; and outputting data based on the travel time, the ray-bending correction, and the amplitude correction.

In a further embodiment, correcting amplitude further comprises preserving amplitude. In still a further embodiment, preserving amplitude further comprises recovering angle dependent amplitudes.

In a further embodiment, the method further comprises removal of a geometrical spreading factor.

In an even further embodiment, determining an amplitude correction further comprises determining amplitude weights. In a further embodiment, the amplitude weights are dependent upon travel time. In a further embodiment, the amplitude weights further comprise emergence angles. In still a further embodiment the emergence angles further comprise:

$$\cos(\alpha_s) = \sqrt{1 - \left(\frac{\partial T_s}{\partial x_s}\right)^2 V_s^2}, \text{ and } \cos(\alpha_g) = \sqrt{1 - \left(\frac{\partial T_g}{\partial x_g}\right)^2 V_g^2}$$

In an even further embodiment, the amplitude weights further comprise:

$$w(\xi, R) = \frac{\sqrt{\cos\alpha_s \cos\alpha_g}}{v_s} \left\{ T\left[\frac{T_g}{T_s^2} + \frac{T_s}{T_g^2}\right] + \frac{4L^2 H^2 \sin^2(\alpha)}{T_s T_g T^2 V_r^4} \right\}.$$

In an even further embodiment, the amplitude weights further comprise:

$$w(\xi, R) = \frac{\sqrt{\cos\alpha_s \cos\alpha_g}}{v_s} \frac{|\det(\Gamma_S^T N_{SR} + \Gamma_S^T N_{SR})|}{\sqrt{|\det(N_{SR})|} \sqrt{|\det(N_{GR})|}}.$$

In still a further embodiment, determining a travel time further comprises determining a velocity profile.

In a further embodiment, determining an offset midpoint traveltime further comprises applying essentially the following formula:

$$T = \sqrt{T_0^2 + \frac{x_s^2}{V_{rms}^2} - C(VTI)x_s^4} + \sqrt{T_0^2 + \frac{x_r^2}{V_{rms}^2} - C(VTI)x_s^4}$$

wherein $$C(VTI) = \frac{2\eta}{V_{rms}^2[T_0^2 V_{rms}^2 + (1 + 2\eta)x^2]}$$

and $$\eta = \frac{\varepsilon - \delta}{1 + 2\delta}$$

where ε and δ are the anisotropic parameters.

In a further embodiment, determining an offset midpoint travel time further comprises applying essentially the following formula:

$$T = \sqrt{T_0^2 + \frac{x_s^2}{V_{rms}^2} - C(VTI)x_s^4} + \sqrt{T_0^2 + \frac{x_r^2}{V_{rms}^2} - C(VTI)x_s^4}$$

wherein $$C(VTI) = \frac{2\eta}{V_{rms}^2[T_0^2 V_{rms}^2 + (1 + 2\eta)x^2]}.$$

In a further embodiment, determining a travel time further comprises determining a travel time for small offset to depth ratios. In a further embodiment, determining a travel time further comprises determining a travel time for large offset to depth ratios.

In a further embodiment, determining a travel time for large offset to depth ratios further comprises applying essentially the following equation:

$$T = T_g + T_s + \Delta T$$
$$= T_{g0}\left(1 + \frac{1}{2}CC\frac{c_4 x_r^6}{T_{g0}^2}\right) + T_{s0}\left(1 + \frac{1}{2}CC\frac{c_4 x_s^6}{T_{s0}^2}\right) + \Delta T(VTI)$$

In alternate embodiments, the method further comprises ray tracing and determining a travel time without ray tracing.

In a further embodiment, the method further comprises correcting for VTI effects.

In still a further embodiment, outputting the seismic data further comprises determining a time-table to calculate the output imaging time. In alternate embodiments, outputting the seismic data further comprises outputting the data in gather modes or in non-gather modes.

In a further embodiment, determining a travel time further comprises determining a VTI travel time. In a further embodiment, determining a VTI travel time further comprises determining an offset-midpoint travel time.

In a further embodiment, the determining and offset-midpoint travel time further comprises determining a migration velocity, and determining an anisotropy parameter.

In a further embodiment, the method further comprises anti-alias filtering the data. In a further embodiment, the method further comprises determining a number of processors required to hold target bins.

In a further embodiment, the correcting amplitude further comprises preserving amplitude.

In an even further embodiment, a system is provided for migrating seismic data. The system comprises means for determining a travel time. In alternate embodiments, means for determining a travel time comprise a computer, a workstation, any software running on any computer, or any other means that will occur to those of ordinary skill in the art. The system further comprises means for determining a ray-bending correction. In alternate embodiments, means for determining a ray-bending correction comprise a computer, a workstation, any software running on any computer, or any other means that will occur to those of ordinary skill in the art. The system further comprises means for determining an amplitude correction. In alternate embodiments, means for determining an amplitude correction comprise a computer, a workstation, any software running on any computer, or any other means that will occur to those of ordinary skill in the art. The system further comprises means for outputting data based on the travel time, the ray-bending correction, and the amplitude correction. In alternate embodiments, means for outputting data comprise a computer, a workstation, any software running on any computer, or any other means that will occur to those of ordinary skill in the art.

In a further embodiment, the means for correcting amplitude further comprises means for preserving amplitude. In alternate embodiments, means for preserving the amplitude comprise a computer, a workstation, any software running on any computer, or any other means that will occur to those of ordinary skill in the art.

In a further embodiment, the means for preserving amplitude further comprises means for recovering incidence angle dependent amplitudes. In alternate embodiments, means for recovering angle dependent amplitudes comprise a computer, a workstation, any software running on any computer, or any other means that will occur to those of ordinary skill in the art.

In a further embodiment, the system further comprises means for removal of geometrical spreading factor. In alternate embodiments, means for removal of geometrical spreading factor comprise a computer, a workstation, any software running on any computer, or any other means that will occur to those of ordinary skill in the art.

In a further embodiment, the means for determining an amplitude correction further comprises means for determining amplitude weights. In alternate embodiments, means for determining amplitude weights comprise a computer, a workstation, any software running on any computer, or any other means that will occur to those of ordinary skill in the art.

In a further embodiment, the means for determining a travel time further comprises means for determining a velocity profile. In alternate embodiments, means for determining a velocity profile comprise a computer, a workstation, any software running on any computer, or any other means that will occur to those of ordinary skill in the art.

In a further embodiment, the means for determining a travel time further comprises means for determining an offset midpoint travel time. In alternate embodiments, means for determining an offset midpoint travel time comprise a computer, a workstation, any software running on any computer, or any other means that will occur to those of ordinary skill in the art.

In a further embodiment, the system further comprises means for ray tracing. In alternate embodiments, means for ray tracing comprise a computer, a workstation, any software running on any computer, or any other means that will occur to those of ordinary skill in the art.

In a further embodiment, the means for determining a travel time further comprises means for determining a travel time without ray tracing. In alternate embodiments, means for determining a travel time without ray tracing comprise a computer, a workstation, any software running on any computer, or any other means that will occur to those of ordinary skill in the art.

In a further embodiment, the system further comprises means for correcting for VTI effects. In alternate embodiments, means for correcting VTI effects comprise a computer, a workstation, any software running on any computer, or any other means that will occur to those of ordinary skill in the art.

In a further embodiment, the means for outputting the seismic data further comprises means for determining a time table to calculate the output imaging time. In alternate embodiments, means for determining a time table comprise a computer, a workstation, any software running on any computer, or any other means that will occur to those of ordinary skill in the art.

In a further embodiment, the means for outputting the seismic data further comprises means for outputting the data in gather modes. In alternate embodiments, means for outputting the data in gather modes comprise a computer, a workstation, any software running on any computer, or any other means that will occur to those of ordinary skill in the art. In a further embodiment, the means for outputting the seismic data further comprises means for outputting the data in non-gather modes. In alternate embodiments, means for outputting the data in non-gather modes comprise a computer, a workstation, any software running on any computer, or any other means that will occur to those of ordinary skill in the art.

In a further embodiment, means for determining a travel time further comprises means for determining a VTI travel time. In alternate embodiments, means for determining a VTI travel time comprise a computer, a workstation, any software running on any computer, or any other means that will occur to those of ordinary skill in the art.

In a further embodiment, the means for determining a VTI travel time further comprises means for determining an offset-midpoint travel time. In alternate embodiments, means for determining an offset-midpoint travel time comprise a computer, a workstation, any software running on any computer, or any other means that will occur to those of ordinary skill in the art.

In a further embodiment, the means for determining and offset-midpoint travel time further comprises means for determining a migration velocity; and means for determining an anisotropy parameter. In alternate embodiments, means for determining a migration velocity comprise a computer, a workstation, any software running on any computer, or any other means that will occur to those of ordinary skill in the art. In alternate embodiments, means for determining an anisotropy parameter comprise a computer, a workstation, any software running on any computer, or any other means that will occur to those of ordinary skill in the art.

In a further embodiment, the system further comprises means for anti-alias filtering the data. In alternate embodiments, means for anti-alias filtering the data comprise a computer, a workstation, any software running on any computer, or any other means that will occur to those of ordinary skill in the art.

In a further embodiment, the system further comprises means for determining a number of processors required to hold target bins. In alternate embodiments, means for determining the number of processor to hold target bins comprise a computer, a workstation, any software running on any computer, or any other means that will occur to those of ordinary skill in the art.

In a further embodiment, the means for correcting amplitude further comprises means for preserving amplitude. In alternate embodiments, means for preserving amplitude comprise a computer, a workstation, any software running on any computer, or any other means that will occur to those of ordinary skill in the art.

In an even further embodiment of the present invention, seismic data is provided. The seismic data is produced by the method comprising determining a travel time; determining a ray-bending correction; determining an amplitude correction; and outputting data based on the travel time, the ray-bending correction, and the amplitude correction.

While many example embodiments of the present invention have been provided, the present description is presented to teach the broad aspect of the invention. This description is in no way exhaustive of the embodiments of the present invention.

What is claimed is:

1. A method for migrating seismic data, comprising:

selecting an image point;

generating a model of seismic velocity with respect to time, the model including substantially horizontal layers each having a selected velocity and a selected thickness;

determining a two-way travel time of seismic energy from at least one seismic energy source position to at least one seismic receiver position wherein the seismic energy is reflected from the image point;

estimating a ray path from the at least one seismic source position to the image point and from the image point to the at least one seismic receiver position, the ray path based on the source position, the receiver position and the velocity model; and determining the two-way travel time of seismic energy through formations to the image point.

2. The method of claim 1 wherein the two way travel time is determined by a sixth order function of offset with respect to travel time.

3. The method of claim 1 wherein the image point is determined by a weighted Kirchhoff integral method.

4. The method of claim 3 further comprising correcting amplitude of the seismic energy for geometrical spreading.

5. The method of claim 4 further comprising preserving angle dependent amplitudes.

6. The method of claim 5 wherein a set of weights is determined for the Kirchhoff integral method using takeoff and emergence angles related to the determined ray path.

7. The method of claim 6 wherein the weights are travel time dependent.

8. The method of claim 1 further comprising correcting the determined two way travel time for effects of transverse isotropy with a vertical axis of symmetry in at least one of the layers forming the model.

9. The method of claim 8 wherein the correcting comprises determining an offset midpoint travel time for the seismic energy.

10. The method of claim 8 wherein the correcting comprises determining an anisotropy parameter.

11. The method of claim 1 further comprising repeating the determining a two-way travel time, estimating a ray path for each of a plurality of different source positions and receiver positions for the image point.

12. The method of claim 11 further comprising generating a common image gather from the plurality of two way travel times.

* * * * *